United States Patent

Nohata et al.

[11] Patent Number: 6,048,045
[45] Date of Patent: *Apr. 11, 2000

[54] PRINTER AND FACSIMILE APPARATUS THAT CAN TEST FOR A PROPER FUNCTIONING INK JET NOZZLE WITHOUT PRINTING A TEST PATTERN

[75] Inventors: Yukio Nohata; Atsushi Saito, both of Yokohama; Takeshi Kohno, Kawasaki; Takashi Ono, Yokosuka; Shinichiro Kohri, Kawasaki; Shigeyuki Sugiyama, Hiratsuka, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/724,276

[22] Filed: Oct. 1, 1996

[30] Foreign Application Priority Data

Oct. 2, 1995 [JP] Japan .................................... 7-255276

[51] Int. Cl.⁷ .................................................... B41J 2/195
[52] U.S. Cl. .................................. 347/7; 347/14; 347/19; 347/43
[58] Field of Search .................................. 347/7, 14, 19, 347/43

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,458,333 | 7/1984 | Sugitani et al. | 346/140 R |
| 4,459,600 | 7/1984 | Sato et al. | 346/140 R |
| 4,463,359 | 7/1984 | Ayata et al. | 346/1.1 |
| 4,608,577 | 8/1986 | Hori | 346/140 R |
| 4,723,129 | 2/1988 | Endo et al. | 346/1.1 |
| 4,740,796 | 4/1988 | Endo et al. | 346/1.1 |
| 5,276,459 | 1/1994 | Danzuka et al. | 347/19 |
| 5,355,159 | 10/1994 | Kaneko | 347/19 |
| 5,398,053 | 3/1995 | Hirosawa et al. | 347/19 |
| 5,508,722 | 4/1996 | Saito et al. | 347/17 |

FOREIGN PATENT DOCUMENTS

| | | | |
|---|---|---|---|
| 54-056847 | 5/1979 | Japan | 347/7 |
| 59-123670 | 7/1984 | Japan | 347/7 |
| 59-138461 | 8/1984 | Japan | 347/7 |
| 60-071260 | 4/1985 | Japan | 347/7 |

*Primary Examiner*—John Hilten
*Assistant Examiner*—Charles H. Nolan, Jr.
*Attorney, Agent, or Firm*—Fitzpatrick, Cella, Harper & Scinto

[57] ABSTRACT

A printer which can perform color printing by using a plurality of color ink, and if some color ink is exhausted, prevents wasteful consumption of other color ink, and a facsimile apparatus, using the printer, which enables to confirm whether or not printing based on received facsimile image data using ink has been normally performed. In a case where printing is performed based on print data from an external computer, printhead 5 is moved to a position opposite to photosensor 8, and test ink discharge is performed with regard to all the plurality of color ink prior to print operation. If it is judged that even one of the plurality of color ink is exhausted, print operation is not performed. In case of printing based on facsimile reception image data, test ink discharge is performed after the print operation. If it is judged that ink is exhausted, received image data is stored into an image memory.

37 Claims, 9 Drawing Sheets

COLOR PRINTHEAD

MONOCHROMATIC PRINTHEAD

PRINTER AND FACSIMILE APPARATUS THAT CAN TEST FOR A PROPER FUNCTIONING INK JET NOZZLE WITHOUT PRINTING A TEST PATTERN

BACKGROUND OF THE INVENTION

This invention relates to a printer and a facsimile apparatus using the printer and, more particularly to a printer which prints an image on a print medium in accordance with an ink-jet printing method and a facsimile apparatus using the printer.

Conventionally, a printer which uses a printhead, comprising a plurality of nozzles, to print an image on a print medium by discharging ink droplets from the nozzles, is known as an ink-jet printer. Recently, a facsimile apparatus employing this ink-jet printer as a printing unit has been proposed.

As a printhead of the printing unit, as well as a monochrome printhead which uses only black ink for monochrome image printing, a color printhead which supplies yellow, magenta, cyan and black color ink to nozzles and discharges ink from the nozzles each assigned to each of the four color ink, thus performs color printing is provided.

However, in the above-mentioned ink-jet printer, if the amount of residual ink is small upon image printing, a printed image may have an unprinted area due to failure of ink discharge on a print medium or an image area of degraded image quality due to abnormality in printing, thus normal image printing cannot be performed. In this case, the printed image lacks image quality worthy of a document. Since such printing has no value, print medium is wasted.

In development and improvement of ink-jet printer, various residual-ink detection methods have been considered, taking the above drawback into consideration. Known examples are, (1) detecting existence/absence of ink within an ink container (ink tank) by ① detecting electric conductivity between a pair of electrodes provided in the container; ② detecting transmittance of irradiated light or quantity of reflection light; (2) detecting change of weight of the ink tank; (3) printing a test pattern on a print medium, and detecting the condition of the printed test-pattern image, to judge whether or not ink discharge has been normally performed; and (4) detecting discharge/undischarge of ink.

When image printing cannot be normally performed as described above, ink-discharge failure may be caused by, not only decreased residual ink or ink exhaustion, but discharge orifices clogged with ink having increased viscosity as it dries. As the latter case may occur even when the amount of residual ink is large, the above methods of detecting ink within an ink container by using electrodes or an optical sensor can hardly detect this phenomenon. On the other hand, the method of detecting the condition of printed image or detecting discharged ink droplets can detect the ink-discharge failure.

In a facsimile apparatus, facsimile image printing is instructed via a telephone line, and image data to be print-outputted is also transmitted via the telephone line. Generally, the facsimile apparatus does not store all the received image data, but when printing for some area has been completed, deletes image data corresponding to the printed area from a memory. This reduces the requirement for memory capacity and reduces costs of the apparatus.

As described above, in the facsimile apparatus using the ink-jet printer as its printer unit, image printing may not be normally performed regardless of residual ink amount. In such case, if it is judged that ink remains, an image of degraded image quality is printed. On the other hand, as received data used in printing is deleted from a memory, to re-print based on the deleted data, it is necessary to request a transmitting side to re-transmit the data, which increases a user's labor. Accordingly, in the facsimile apparatus, it is desirable to employ the method of detecting the condition of printed image and/or the method of detecting ink-discharge status, which enables to detect not only decreased residual ink amount but degradation of ink discharge due to clogged nozzles.

However, there is a possibility that ink-discharge failure occurs after it is judged that ink discharge is normally performed. Accordingly, it is undesirable to delete image data immediately after image printing, since if ink-discharge failure occurs at that point, the image data is deleted from the memory although an image has not been normally printed.

Further, as the facsimile apparatus employing the above-mentioned ink-jet printer as a printing unit, a facsimile apparatus having a function to be connected to a host device such as a computer, similar to general printers, and prints image based on data from the host device has been proposed. Generally, in operation as a facsimile apparatus, image formation is performed by using only black ink, while in case of image printing based on data from a connected host device, color image printing is possible by using the aforementioned color printhead.

In the method of judging the condition of printed image and the method of discharging ink and judging the discharge status, ink is used upon detection. When the color printhead is attached to the facsimile apparatus but the apparatus performs facsimile reception printing, if ink-discharge status is judged with respect to other color ink than black ink, the other color ink are wasted.

SUMMARY OF THE INVENTION

Accordingly, the present invention has its object to provide a printer which reduces wasteful ink consumption upon judgment of whether or not ink discharge is normally performed upon image printing.

According to the present invention, the foregoing object is attained by providing a printer which uses a printhead, having an exchangeable ink tank containing a plurality of color ink and capable of color printing, and which performs printing by discharging ink on a print medium, comprising: input means for inputting print data from an external device; test discharge means for discharging ink from the printhead as test discharge; detection means for detecting ink droplets discharged by the test discharge means; judgment means for judging existence or absence of residual ink, based on the result of detection by the detection means; display means for displaying a message advising to change the ink tank, based on the result of judgment by the judgment means; test-discharge control means for controlling the test discharge means to perform the test discharge prior to printing on the print medium based on the print data inputted by the input means; and print control means for performing the printing only when it is confirmed that sufficient ink for all the plurality of colors remains.

It is another object of the present invention to provide a facsimile apparatus using the above printer which performs printing based on received facsimile image data and then performs ink-discharge status detection after the printing, thus enables to confirm whether or not the received image has been normally printed.

According to the present invention, the foregoing object is attained by providing a facsimile apparatus using a printer claimed in claim 1 comprising: receiving means for receiving image information transmitted via a communication line; memory means for storing the image information received by the receiving means; instruction means for selecting a printer mode or a facsimile mode and instructing the selected mode as an apparatus operation mode; and control means for, if the instruction means has instructed the facsimile mode as the apparatus operation mode and the image information received by the receiving means exists in the memory means, performing print operation based on the image information, then driving the test discharge means to test-discharge ink.

In accordance with the present invention as described above, when the printer prints an image on a print medium by using the printhead which comprises an exchangeable ink tank containing a plurality of color ink and which is available for color printing, prior to printing based on input print data on the print medium, the printer performs test discharge of ink from the printhead. In the test discharge, discharged ink droplets are detected, and based on the detection result, it is judged whether or not ink remains. In accordance with the judgment result, a message advising to change the ink tank is displayed, and only if it is confirmed that sufficient quantity of all the plurality of color ink remain, print operation is performed.

In the test discharge, magenta ink, cyan ink, yellow ink and black ink are all discharged.

Upon test discharge, ink droplets are detected by using light-emission means for emitting light to a position, where ink droplets discharged from ink-discharge orifices of the printhead pass, photoreception means for receiving the light, and measurement means for measuring a period in which the light is interrupted between the light-emission means and the photoreception means.

The light-emission means includes an infrared LED, on the other hand, the photoreception means includes a phototransistor for generating an electric signal based on received light.

Note that the printhead may be an ink-jet printhead which performs printing by discharging ink or a printhead which utilizes thermal energy to discharge ink and has transducers for generating thermal energy to be supplied to ink.

The facsimile apparatus having the above construction has, as its operation modes, a printer mode and a facsimile mode for a user's selection. When the facsimile mode is designated as the operation mode and image information received from a communication line exists in the memory means, the apparatus performs print operation based on the image information, thereafter, it performs ink-discharge status detection by test ink discharge.

Then, in accordance with the result of ink-discharge status detection, the apparatus performs control so as to hold or delete the image information stored in the memory means.

As the printhead used in the facsimile apparatus, as well as a printhead which comprises an exchangeable ink tank for containing a plurality of color ink and which is available for color printing, a printhead which comprises an exchangeable ink tank for containing only black ink and which is only available for monochrome printing can be employed.

The present invention is particularly advantageous since printing is not performed if ink of one color is exhausted, thus preventing wasteful ink consumption.

Further, according to the facsimile apparatus of the present invention, in operation in the facsimile mode, if image information received from the communication line exists in the memory means, the apparatus performs printing based on the image information, thereafter, performs ink-discharge status detection by test ink discharge. This enables to confirm whether or not the print operation has been normally performed using ink.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
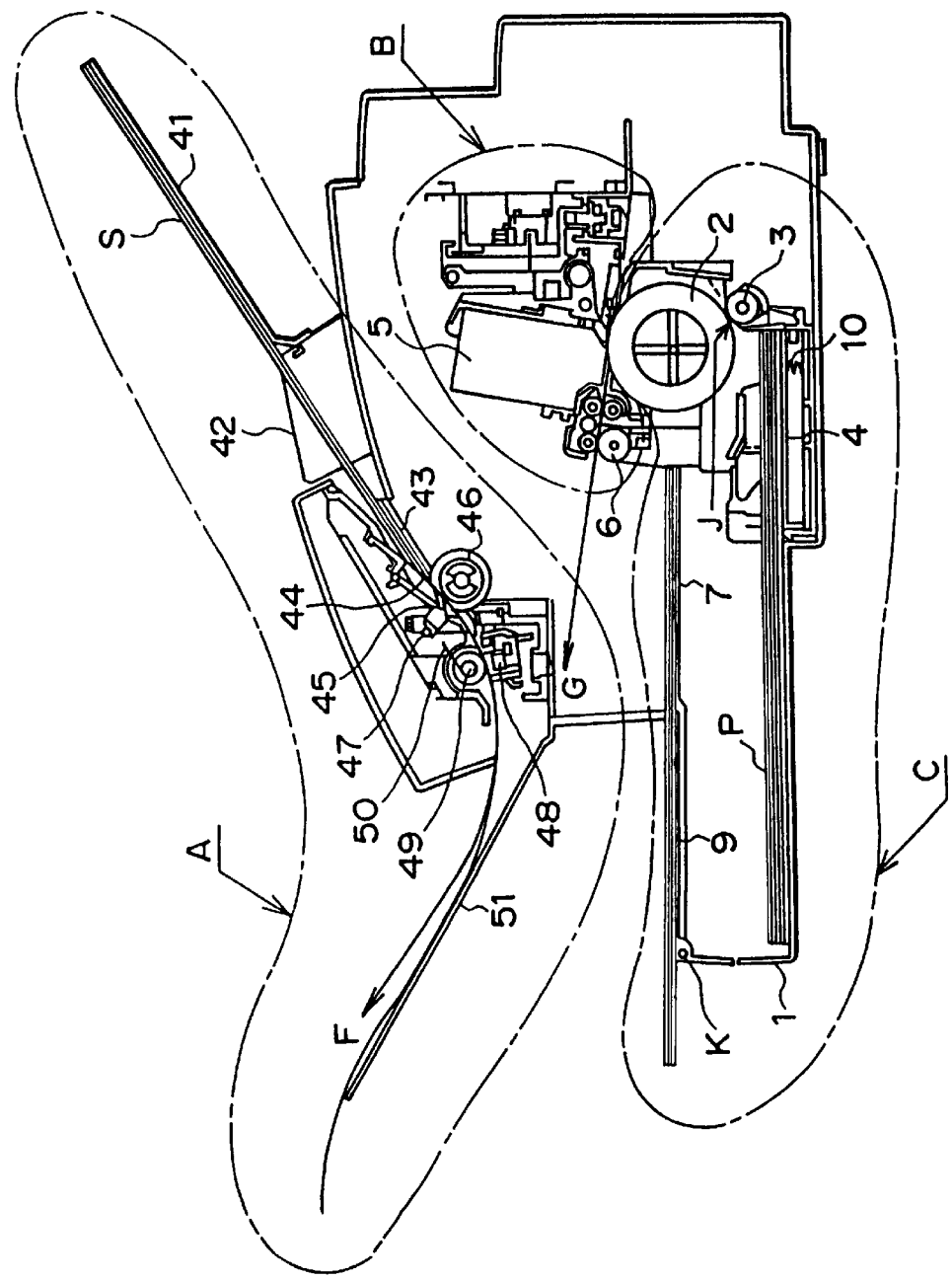
FIG. 1 is a cross-sectional view showing a structure of a facsimile apparatus comprising a printer, which performs printing by a printhead in accordance with an ink-jet printing method, according to a representative embodiment of the present invention.

FIG. 1 is a cross-sectional view showing a structure of a facsimile apparatus comprising a printer, which performs printing by a printhead in accordance with an ink-jet printing method, according to a representative embodiment of the present invention.

The printer has a cartridge type monochrome printhead for monochrome printing or a cartridge type color printhead for color printing. Both printheads are exchangeable. Further, both printheads integrally include an exchangeable ink tank.

Hereinbelow, the general structure of the facsimile apparatus will be described with reference to FIG. 1. In FIG. 1, reference A denotes a reader which optically reads an original; B, a printer which performs printing in accordance with an ink-jet printing method; and C, a paper feeder which supplies print medium such as a print sheet P, set in a paper cassette, one sheet at a time, to the printer B.

First, the flow of conveyance of the print sheet P will be described. A conveyance path of the print-sheet P is as shown by an arrow G. That is, the print sheet P set in the paper cassette 1 of the paper feeder C is picked up by a paper-feed roller 2 and a retard roller 3, and supplied to the printer B by the paper-feed roller 2. The printer B performs printing by discharging ink from a printhead 5 on the print sheet P, while conveys the print sheet P in synchronization with the printing. When the printing is completed, the print sheet P is discharged by a discharge roller 6 onto a discharger stacker 7.

Next, the specific construction of the paper feeder C will be described.

In FIG. 1, the paper cassette 1 for containing a plural number of print sheets P has a middle plate 4 on which the print sheets P are placed. The middle plate 4 is biased upward from its back by a middle-plate spring 10 provided opposite to the paper-feed roller 2. In paper-feed stand-by status, the middle plate 4 has a structure which is pressed downward by a cam or the like and when the number of print sheet P has decreased or there is no print sheet P, additional print sheets can be easily set.

On the other hand, when a print signal is detected and paper-feed operation is started, the middle plate 4 pressed downward by the cam and the like is released, and the print sheet P is picked up by the paper-feed roller 2. The retard roller 3 is positioned opposite to the paper-feed roller 2, and is cooperated with the middle plate 4 to change the position of the print sheet P. Upon paper-feed operation, only the uppermost print sheet P, biased by the middle plate 4 and picked up by the paper-feed roller 2, is separately conveyed by cooperation at a unit J with the paper-feed roller 2. The separated print sheet P is supplied, while being held so as to sufficiently wind around the paper-feed roller 2, to the printer B.

Next, a discharge mechanism for the paper sheet P printed by the printer B will be described.

The print sheet P discharged by the discharge roller 6 is discharged onto the discharge stacker 7. The discharge stacker 7 has an auxiliary discharge tray 9 which rotates on a hinge K. In a case where the print sheet P is used from the shorter side as the top, the auxiliary discharge tray 9 is rotated so as extend the stacker area of the discharge stacker 7 in the paper-discharge direction. The discharge stacker 7 also serves as a cover of the paper cassette 1. Note that the discharge stacker 7 and the auxiliary discharge tray 9 respectively have a plurality of ribs (not shown). The printed print sheet P is slided on the plurality of ribs, and sequentially accumulated.

Further, the flow of conveyance of an original S will be described.

A conveyance path for the originals is as shown by an arrow F in FIG. 1. In FIG. 1, the original S is placed, with the image-side surface being faced down, on an original tray 41. The original S placed on the original tray 41 is positioned by a slider 42 which is movable in an original-widthwise direction. As the original S is placed on the original tray 41, the original S is pressed by a pre-conveyance pressing piece 43 from an upper position via a pre-conveyance spring 44, and the original S is preliminarily conveyed in cooperation with a separation roller 46.

Then, preliminarily-conveyed originals S are separately conveyed from the bottom sheet in cooperation with a separation piece 45 and the separation roller 46, pressed downward by an ADF spring 47, one by one. Further, the separation roller 46 conveys the separated original S to a reading position. Thus, the image on the original S separately-conveyed by the separation roller 46 to the reading position is read by a reading sensor(photoelectric transducer) 48. A CS roller 49 is biased by a CS pressing spring 50 along a reading line of the reading sensor 48, to press the separately-conveyed original S against the reading line. Further, the CS roller 49 determines a reading speed for reading the original S in a sub-scanning direction (original-conveyance direction), and discharges the read original S. Finally, the discharged original S is stacked on the discharge tray 51. Note that the discharge tray 51 is detachable from the apparatus main body.

Figure 2:
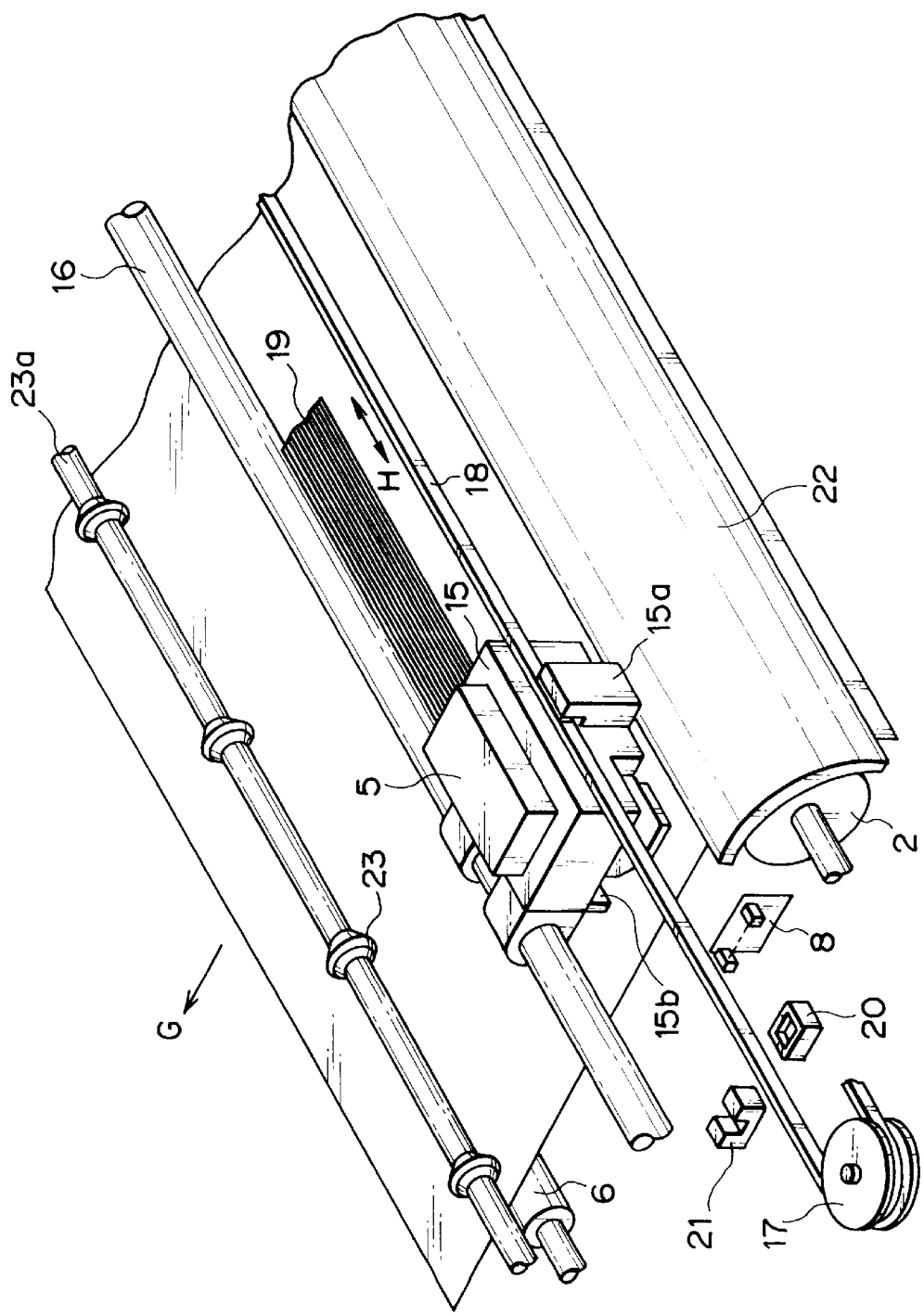
FIG. 2 is a perspective view showing a detailed structure of a printer B of the facsimile apparatus in FIG. 1.

FIG. 2 is a perspective view showing the detailed structure of the printer B. As shown in FIG. 2, the printhead 5 is a cartridge type printhead which integrates an exchangeable ink tank for a new ink tank when ink is exhausted. Further, the printhead 5 is a cartridge type printhead comprising a monochrome printhead or a cartridge type printhead comprising a color printhead, and any of the cartridges can be changed according to printing purpose. Note that nozzle arrangement and the construction of the ink tank of the monochrome and those of the color printhead cartridges will be described later.

Next, the principle of an ink-discharge from the printhead will be described. Generally, the printhead comprises fine liquid discharge orifices, fluid channels and energy acting portions each provided at a part of each fluid channel, and energy-generating portions which generate liquid-droplet formation energy to be acted on liquid at the energy-generating portions.

The energy-generating portion may employ a electromechanical transducer such as a piezoelectric device; otherwise, the energy-generating portion may irradiates an electromgnetic wave such as a laser beam upon a liquid so that electromagnetic energy is absorbed in the liquid, the liquid is heated up, and the liquid droplets are discharged by action due to generated heat; otherwise, the energy-generating portion may employ an electrothermal transducer to heat a liquid and discharge the liquid. Above all, a printhead using an ink-discharge method utilizing thermal energy can perform high-resolution printing, since the liquid-discharge orifices for discharging liquid droplets for printing can be arranged in high density.

A printhead using the electrothermal transducers as the energy-generating portions can be easily minimized. This printhead can fully utilize advantages of IC-manufacturing techniques and microprocess techniques, which have been greatly improved and are highly reliable in recent semiconductor-manufacturing. Further, the number of print nozzles in this printhead can be increased in one direction so as to extend the printing width or print nozzles in this printhead can be assembled to form two-dimensional (two rows) nozzle array. For these reasons, this printhead is suitable for multi-nozzle manufacturing and high-density assembling. Further, this printhead can be directed to mass production with low production costs.

Thus, the printhead, using electrothermal transducers as the energy-generating portions, manufactured via semiconductor-manufacturing processes, generally has ink channels corresponding to respective ink-discharge orifices and electrothermal transducers as means for forming discharge ink droplets. The electrothermal transducers impart thermal energy to ink filling the ink channels, and discharge the ink from corresponding ink-discharge orifices. The ink channels are connected to a common liquid chamber, and they are supplied with the ink from the common liquid chamber.

The construction of the printer B will be described with reference to FIG. 2.

In FIG. 2, a carriage 15 scans the printhead 5 in a direction (main-scanning direction; represented by an arrow H) orthogonal to the print-sheet P conveyance direction (subscanning direction; represented by arrow G direction in FIG. 1), while holding the printhead 5 with high precision. The carriage 15 is slidably held by a guide shaft 16 and a thrust member 15a. The scanning movement of the carriage 15 is performed by a pulley 17 driven by a carriage motor 30 (not shown in FIG. 2) and a timing belt 18. At this time, a print signal and electric power are supplied via a flexible cable 19 to the printhead 5 from an electric circuit of the apparatus main body. The printhead 5 and the flexible cable 19 are connected by press-connecting respective contact points with each other.

A cap 20 which functions as an ink receptor is provided at the home position of the carriage 15 of the printer B. The cap 20 moves up/down in accordance with necessity. When the cap 20 moves up, it comes into tight contact with the printhead 5 to cover the nozzle portion of the printhead 5, thus preventing evaporation of ink and attachment of extraneous matter (dust) to the nozzles.

In this apparatus, to arrange the printhead 5 and the cap 20 to positions relatively opposite to each other, a carriage home-position sensor 21 provided in the apparatus main body and a light-shield plate 15b provided at the carriage 15 are employed. The carriage home-position sensor 21 uses a photo-interrupter. When the carriage 15 moves to a standby position, light irradiated from a part of the carriage home-position sensor 21 is interrupted by the light-shield plate 15b; at this time, it is detected that the printhead 5 and the cap 20 are at relatively opposite positions.

In FIG. 2, the print sheet P is fed from the lower side to the upper side in this drawing paper, and bent in a horizontal direction by the paper-feed roller 2 and the paper guide 22, then transferred in the arrow G direction (subscanning direction). The paper-feed roller 2 and the discharge roller 6 are respectively driven by a drive motor (not shown); they operate, interlocked with scanning of the carriage 15, to convey the print sheet P in the subscanning direction with high precision. Further, rollers 23 comprising of water repellent material and having blade-like circumferential portions to contact the print sheet P are provided for paper feeding in the subscanning direction. The rollers 23 are arranged on a roller shaft 23a opposite to the discharge roller 6, at a predetermined intervals. Even when the rollers 23 come into contact with unfixed image on the print sheet P immediately after printing, the rollers 23 guide and convey the print sheet P without influencing the image.

Figure 3:
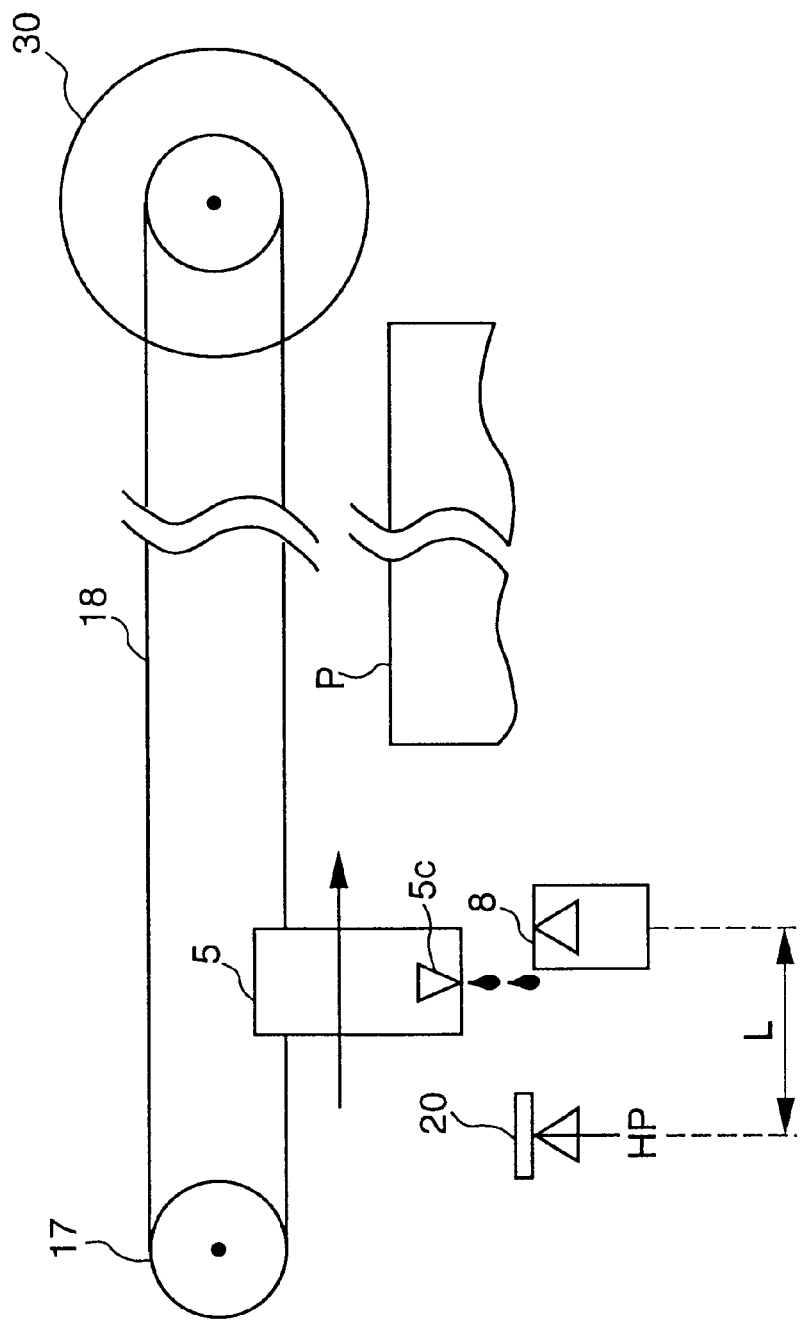
FIG. 3 is a schematic view showing a construction around a photosensor 8 of the printer B.

FIG. 3 is a schematic view showing a construction around a photosensor 8 of the printer B. As shown in FIG. 3, the photosensor 8 is provided between the cap 20 and the side end of the print sheet P, at a position opposite to a nozzle array 5c of the printhead 5. The photosensor 8 optically detects ink droplets discharged by the nozzles of the printhead 5. When there is no ink in the printhead 5, the ink-exhausted status can be judged from output from the photosensor 8.

In the present embodiment, the photosensor 8 employs an infrared LED as a light-emission device, and a lens is integrally molded on the light-emission surface of the LED, so as to irradiate light in approximately parallel toward a photoreception device. The photoreception device is a photo-transistor having a 0.7×0.7 mm hole formed of a mold member, on the optical axis, on its photoreception surface. That is, a detection range is narrowed to 0.7 mm in height and 0.7 mm in width between the photoreception device and the light-emission device. The optical axis connecting the light-emission device and the photoreception device is set to parallel to the nozzle array 5c of the printhead 5. The interval between the light-emission device and the photoreception device is greater than the length of the nozzle array 5c of the printhead 5. When the optical axis and the position of the nozzle array 5c coincide, all ink droplets discharged from the nozzles of the printhead 5 pass the detection range between the light-emission device and the photoreception device. As the ink droplets pass the detection range, the ink droplets interrupt light from the light-emission side, and decrease light intensity to the photoreception side, thus the output from the photo-transistor as the photoreception device changes.

Similar to positioning of the printhead 5 and the cap 20, the carriage home-position sensor 21 provided in the apparatus main body is used to arrange the nozzle array 5c of the printhead 5 and the photosensor 8 at relatively opposite positions.

Figure 4:
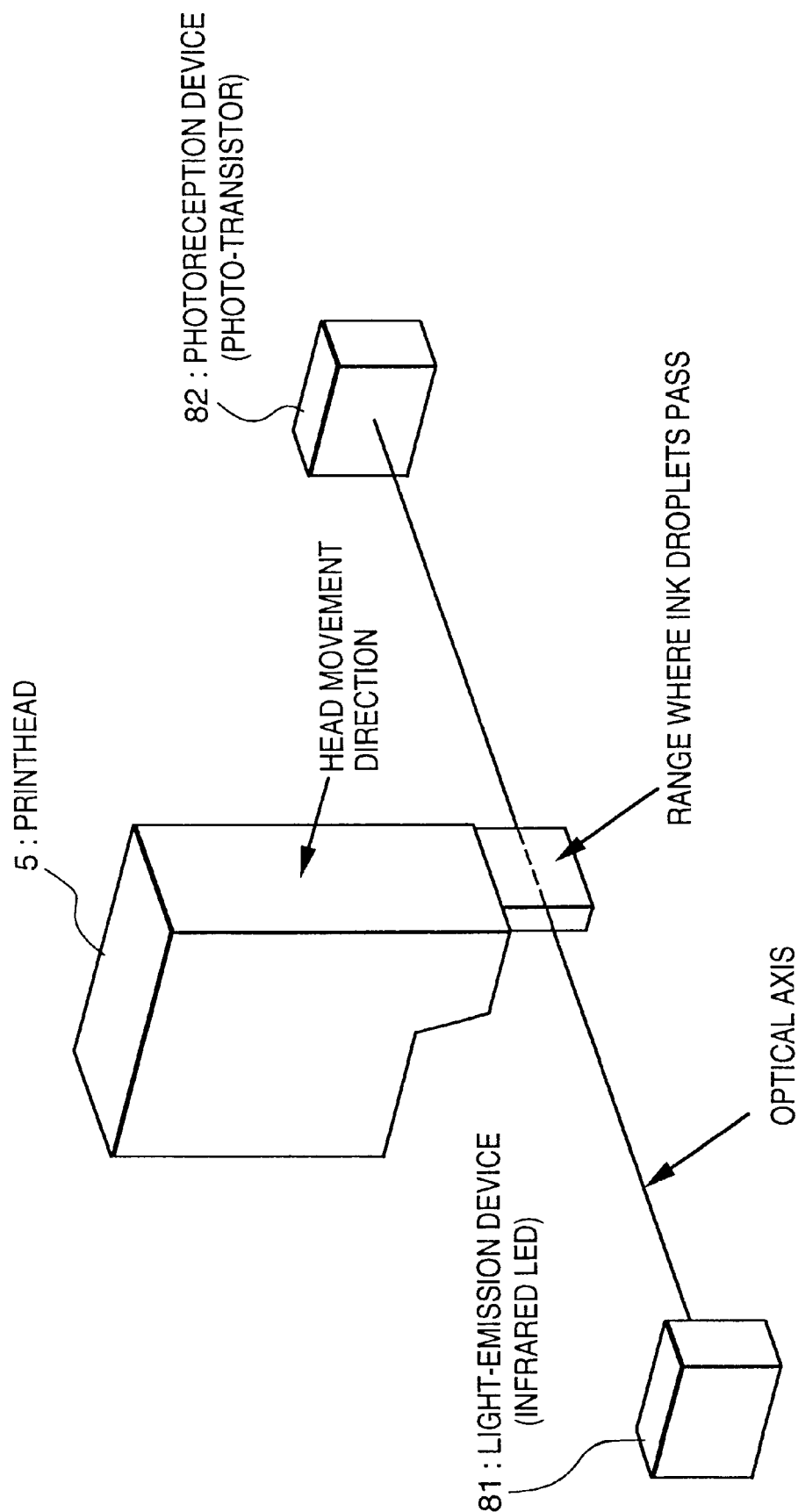
FIG. 4 is an explanatory view showing arrangement where ink discharged from the printhead interrupts a light beam from an infrared LED 81 as a light-emission device of the photosensor 8.

As shown in FIG. 3, this embodiment converts a distance (L), between the home position (HP) of the printhead 5 and a position on the optical axis of the photosensor 8, into a number of steps of a motor for driving the carriage 15, and sets in advance this number of steps of the motor as a constant in a control program to execute print operation. Thus, by moving the carriage 15 by a predetermined amount after detection of the home position, the nozzle array 5c of the printhead 5 and the optical axis of the photosensor 8 are precisely set at relatively opposite positions. As shown in FIG. 4, ink-discharge status detection is performed by moving the printhead 5 to a position close to the photosensor 8 before printing for one page or after the completion of printing, and discharging ink so as to pass through a light beam from the infrared LED 81. If the discharged ink interrupts the light beam traveling to a photo-transistor 82, which is the photoreception device of the photosensor 8, it is judged that ink discharge is normally performed.

Figure 5:
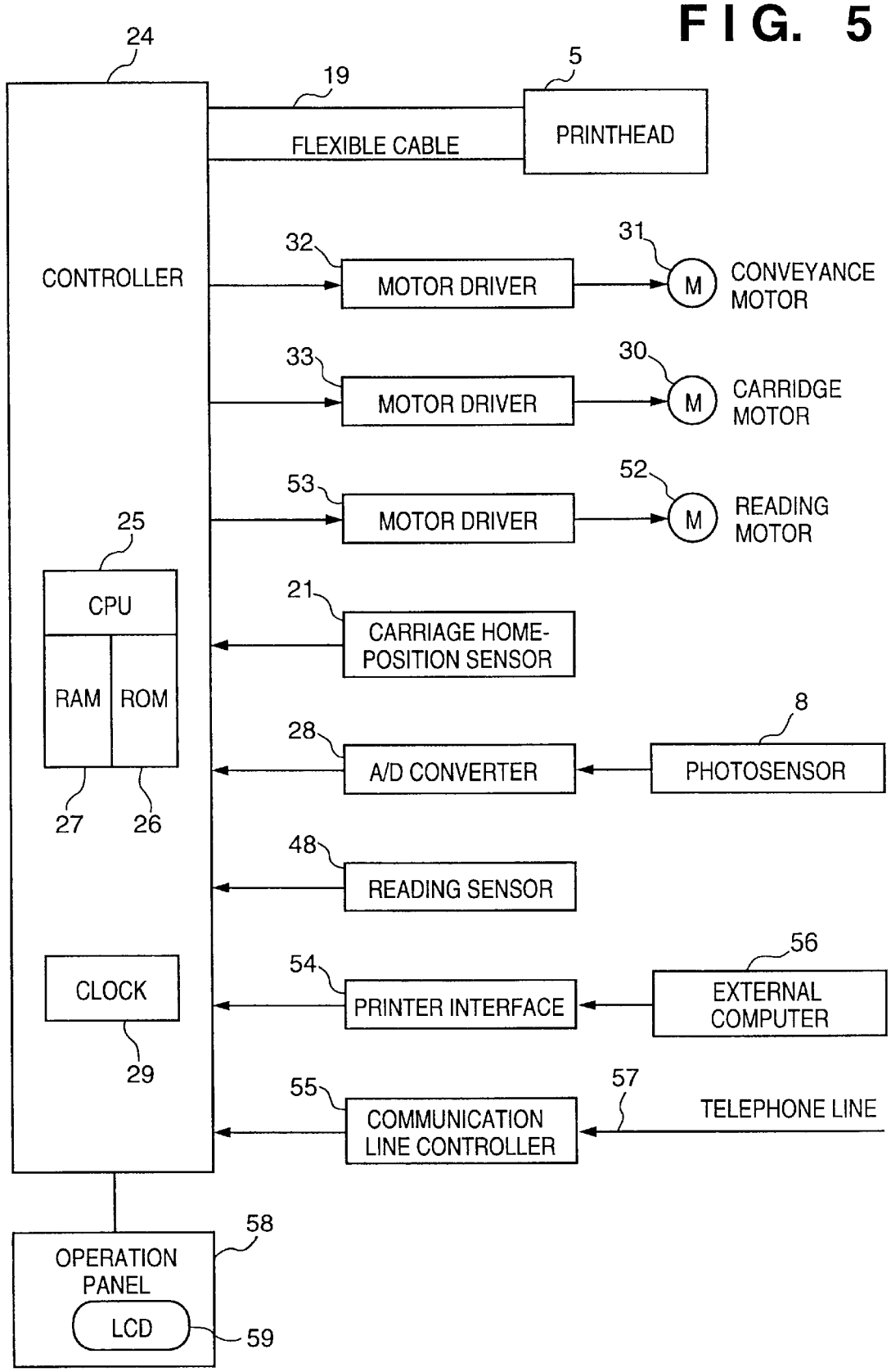
FIG. 5 is a block diagram showing a control construction of the facsimile apparatus in FIG. 1.

FIG. 5 is a block diagram showing a control construction of the facsimile apparatus in FIG. 1.

In FIG. 5, numeral 24 denotes a controller for controlling the overall apparatus. The controller 24 comprises a CPU. 25, a ROM 26 in which control programs to be executed by the CPU 25 and various data are stored, a RAM 27 used as a work area for execution of various processing by the CPU 25 and used for temporarily storing various data, and the like.

As shown in FIG. 5, the printhead 5 is connected to the controller 24 via the flexible cable 19. The flexible cable 19 includes a control-signal line from the controller 24 to the printhead 5 and an image signal line. The output from the photosensor 8 is digitized by an A/D converter 28 so that it can be analyzed by the CPU 25. The carriage motor 30 is rotatable based on a pulse-step number from a motor driver 32. Further, the controller 24 controls the carriage motor 30 via a motor driver 33, a conveyance motor 31 via a motor driver 32, and a reading motor 52 via a motor driver 53. Also, it inputs output from the carriage home-position sensor 21.

The controller 24 is connected to image-data input devices such as the reading sensor 48, a printer interface 54 for receiving print instruction from an external computer 56 and print data, and a line controller 55 for receiving reception data from a telephone line 57. Thus, the controller 24 can be used with a printer for facsimile transmission/reception, a copier, and a printer of the external computer. Further, the controller 24 is connected to an operation panel 58 for a user of the apparatus to perform various operations and instructions. The operation panel 58 has an LCD 59 for displaying messages.

Figure 6:
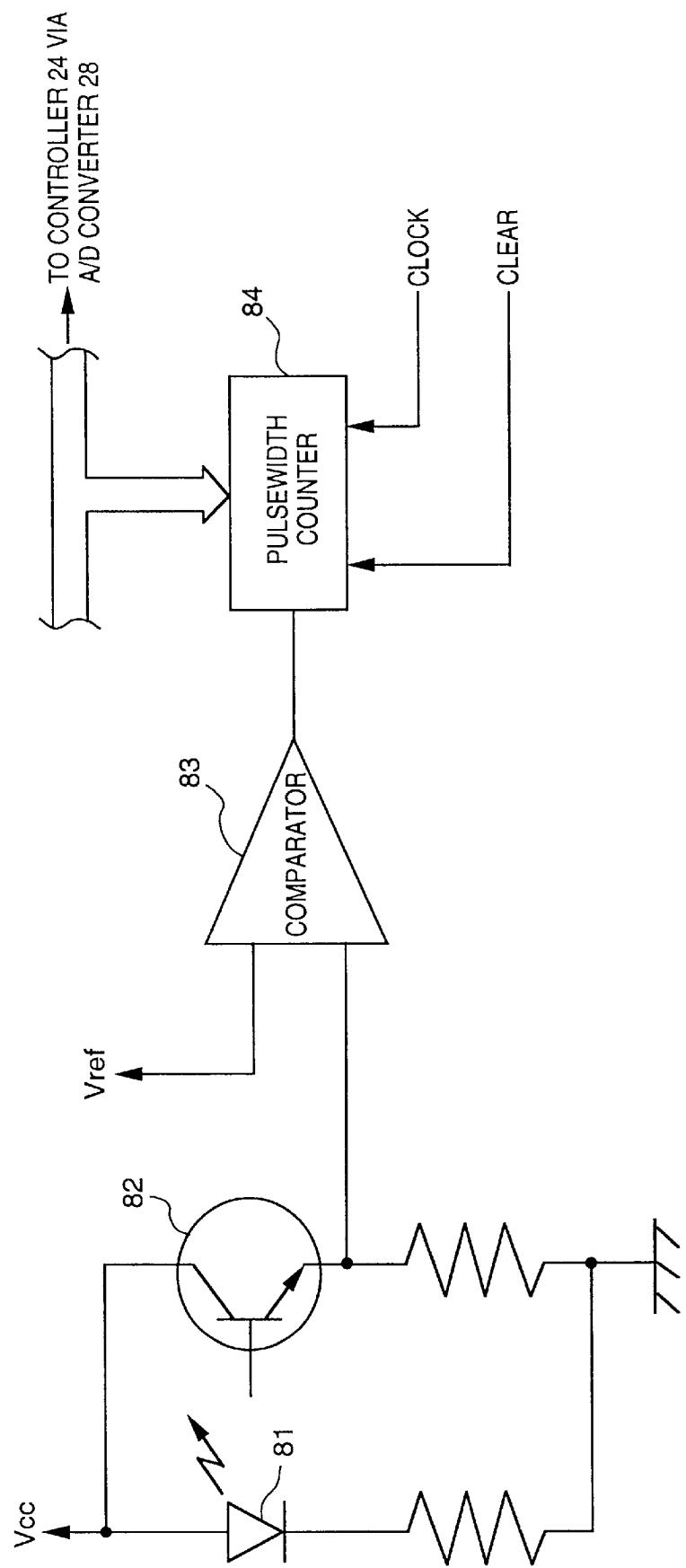
FIG. 6 is a block diagram showing an electrical construction of the photosensor 8.

FIG. 6 is a block diagram showing an electrical construction of the photosensor 8.

In FIG. 6, numeral 81 denotes the infrared LED as the light-emission device; 82, the photo-transistor as the photoreception device to receive an infrared light beam from the infrared LED 81; 83, a comparator which inputs output from the photo-transistor 82 and compares it with a predetermined reference voltage (Vref); and 84, a pulsewidth counter which measures a duration (pulsewidth) of ON/OFF status of a signal outputted from the comparator 83. The pulsewidth counter 84 uses a pulsewidth of an inputted clock (reference clock) as a reference pulsewidth. The pulsewidth counter 84 counts cycles of the reference clock for the duration of ON/OFF status of the signal outputted from the comparator 83, and outputs a count value to an internal register of the pulsewidth counter 84.

If ink is not discharged from the printhead 5, the infrared light beam from the infrared LED 81 as the light-emission device is not interrupted, the comparator 83 inputs a high (H) level signal from the photo-transistor 82 as the photo-reception device. On the other hand, if ink is discharged from the printhead 5, the discharged ink interrupts the infrared light beam from the infrared LED 81, the output level of the signal from the photo-transistor 82 is gradually lowered. When the output level becomes lower than the reference voltage (Vref) inputted into the comparator 83, the output from the comparator 83 to the pulsewidth counter 84 is inverted. Thereafter, when the ink discharge from the printhead 5 has been completed, the output level of the signal from the photo-transistor 8 becomes high (H) again, and when the output level exceeds the reference voltage (Vref) inputted into the comparator 83, the output from the comparator 83 is inverted again.

Thus, the pulsewidth counter 84 inputs a signal corresponding to a duration in which the photosensor 8 detects discharged ink. As described above, the duration of the signal ON/OFF status is measured by using the reference clock, and the count value is stored into the internal register of the pulsewidth counter 84. The count value is read out by the CPU 25 of the controller 24, and used for judgment of existence/absence of ink. In the construction shown in FIG. 6, the count value is transferred to the CPU 25 via the A/D converter 28. However, depending on the construction of the pulsewidth counter 84, the count value may be directly read out by the CPU 25, without using the A/D converter 28.

Figure 7A:
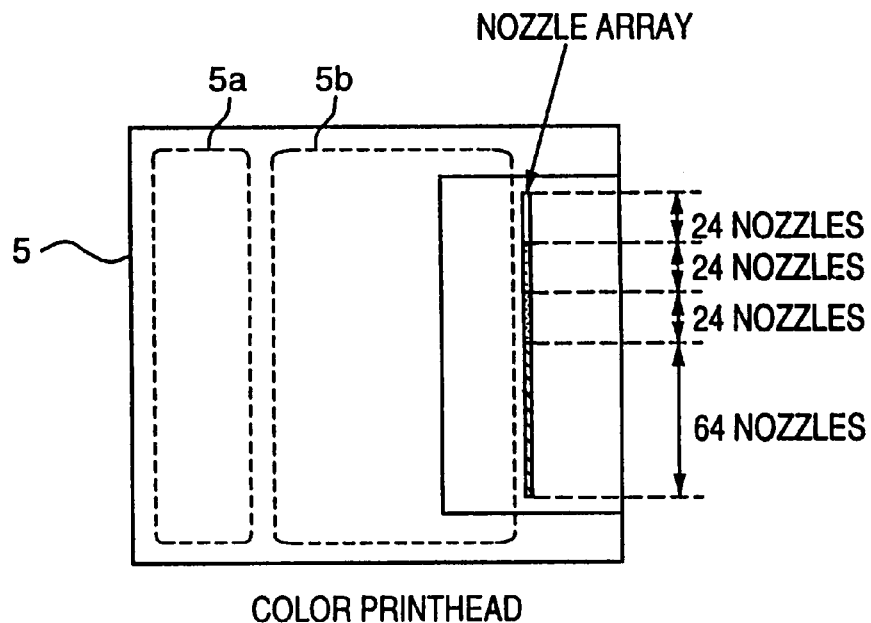
FIGS. 7A and 7B are explanatory views respectively showing a structure of a color printhead and that of a monochrome printhead.
Figure 7B:
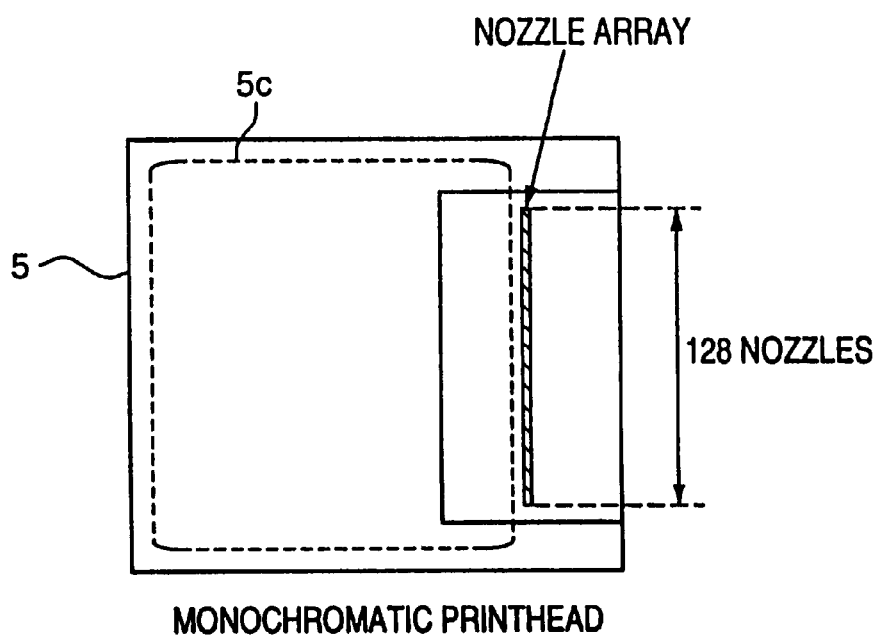

FIGS. 7A and 7B are explanatory views showing a structure of a color printhead and that of a monochrome printhead, used in the facsimile apparatus in FIG. 1. The facsimile apparatus uses the monochrome printhead as shown in FIG. 7B, having 128 nozzles, for printing in 360 dpi resolution, or the color printhead as shown in FIG. 7A, having 64 black-ink nozzles, 24 yellow-ink nozzles, 24 magenta-ink nozzles, and 24 cyan-ink nozzles, for printing using only black ink in 360 dpi resolution. In the color printhead, since ink colors are pre-determined with respect to respective nozzle groups, the color of ink to be discharged can be selected by selecting nozzles to receive heat pulses. By selecting from the two types of printheads, high-speed monochrome printing or high-precision full-color printing can be performed. When the color printhead is attached, if a facsimile image has been received, the 64 black-ink nozzles are used for printing based on the received image.

As shown in FIG. 7A, the color printhead has two ink tanks 5a and 5b; 5a is used for containing black ink, and 5b, for containing yellow, magenta and cyan ink. The ink tanks 5a and 5b can be changed independently. On the other hand, the monochrome printhead has a large-capacity ink tank 5c for containing black ink. Also, the ink tank 5c can be changed.

It is understood from the nozzle arrangement as shown in FIGS. 7A and 7B, the number of black-ink nozzles (64) of the color printhead is half of the nozzles (128) of the monochrome printhead. In a case where only the black ink is discharged from the color printhead, the output level of the signal from the photo-transistor 82 is not lowered in comparison with ink discharge from the monochrome printhead. In addition, the pulsewidth measured by the pulsewidth counter 84 in this case is comparatively short. Generally, upon driving a printhead, to reduce electric power consumed at once and avoid overheating the printhead itself, time-divisional drive control is performed. That is, assuming that the number of nozzles to discharge ink at once is eight, for example, in a printhead having 64 nozzles, printhead drive is made eight times; in a printhead having 128 nozzles, printhead drive is made sixteen times. Accordingly, when the color printhead is used for printing with only black ink, in comparison with black-ink discharge from the monochrome printhead, time necessary for ink discharge is half.

Next, ink-discharge status detection in the facsimile apparatus having the above construction will be described with reference to the flowcharts of FIGS. 8 and 9. Note that the facsimile apparatus can switch over the printer mode for receiving image data from the external computer 56 and performing print operation, in accordance with an instruction from the operation panel 58, and the facsimile mode for transmitting/receiving a facsimile image via the telephone line 57. When the apparatus operates in the printer mode, the color printhead is attached, and color printing is performed based on color print data from the external computer 56.

At step S100, the CPU 25 examines whether the operation mode of the apparatus is set from the operation panel 58 to the facsimile mode or the printer mode. If the operation mode is the facsimile mode, the processing proceeds to step S101, while if the operation mode is the printer mode, proceeds to step S200. At step S200, ink-discharge status detection in the printer mode is performed. This processing will be described in detail with reference to FIG. 9.

At step S101, it is examined whether or not a received facsimile image data is stored in an image memory of the RAM 27. If NO, i.e., there is no received image data in the image memory, the processing returns to step S100, while if YES, i.e., received image data exists in the image memory, the processing proceeds to step S102, at which image printing based on the received image data is performed. After the completion of the print operation, the processing proceeds to step S103, at which the printhead 5 is moved at a position opposite to the photosensor 8 and ink-discharge status detection with respect to black ink is performed. Different from normal ink discharge in printing, the ink discharge at this position opposite to the photosensor 8 is test discharge for detecting a discharge of ink droplets, and is made when printing is not performed. At step S104, the completion of discharge at step S103 is confirmed, then a count value of the pulsewidth counter 84 is read, and based on the read count value, discharge status of black ink is determined.

If it is determined that the black ink is not discharged, the processing proceeds to step S105, at which a message advising to change the ink tank for black ink is displayed on the LCD 59. Further, at step S106, the received image data is stored into the image memory, without deleting it, so that the image data be held for outputting again after the ink tank has been changed. On the other hand, if it is determined that the black ink is discharged, it is judged that printing based on the received image has been normally performed, and the processing proceeds to step S107, at which the image data is deleted from the image memory, and the processing ends.

Next, ink-discharge status detection (step S200) when the apparatus operates in the printer mode will be described with reference to FIG. 9. In this case, the color printhead is attached to the apparatus, and the following processing is executed upon reception of print image data from the external computer 56.

At step S201, the printhead 5 is moved to a position opposite to the photosensor 8, then the infrared LED 81 as the light-emission device is turned on, and black ink is discharged for ink-discharge status detection with respect to black ink. As described above, this discharge is made such that discharged ink interrupts a light beam from the light-emission device to the photoreception device of the photosensor 8. Further, this discharge is made by supplying heat pulses to only nozzles corresponding to the black ink of the color printhead.

At step S202, after the ink discharge, a count value of the pulsewidth counter 84 is read, and based on the read count value, whether the black ink is discharged or not is judged. If it is judged that the black ink is not discharged, the processing proceeds to step S205, at which a message advising a user to change the ink tank containing black ink is displayed on the LCD 59, and the processing ends. At this time, image data received from the external computer 56, if any, is stored into the image memory so that the data can be outputted after the ink tank has been changed.

On the other hand, if it is confirmed at step S202 that the black ink is discharged, the processing proceeds to step S203, at which it is examined whether or not the current print operation is color print operation. This examination can be made by determining whether or not print image data includes color data other than black color data. Further, if it is arranged such that a color print mode or a monochrome print mode can be selected as the printer mode, the printer mode can be examined. If it is determined that monochrome printing is to be performed, as color ink is not necessary, the processing proceeds to step S204 without examining discharge status of color ink. At step S204, monochrome image printing using only the black ink is performed, and the processing ends. If it is determined at step S203 that the current printing is color printing using color ink, the processing proceeds to step S206, at which, similar to judgment of discharge status of black ink at step S202, the printhead 5 is moved to the position opposite to the photosensor 8, and ink-discharge status detection with respect to yellow ink is performed.

Next, at step S207, discharge status of yellow ink is judged. If it is judged that the yellow ink is not discharged, the processing proceeds to step S212, at which a message advising the user to change the ink tank containing color ink is displayed on the LCD 59, and the processing ends without image printing. At this time, image data received from the external computer 56, if any, is stored into the image memory so that the data can be outputted after the ink tank has been changed. If it is judged at step S207 that the yellow ink is discharged, the processing proceeds to step S208, at which ink-discharge status detection with respect to magenta ink is performed.

At step S209, discharge status of magenta ink is judged. If it is judged that the magenta ink is not discharged, the processing proceeds to step S212, at which the above-described message is displayed, and the processing ends without image printing. On the other hand, if it is judged at step S209 that the magenta ink is discharged, the processing proceeds to step S210, at which ink-discharge status detection with respect to cyan ink is performed.

At step S211, whether cyan ink remains or not is judged. If it is judged that the cyan ink is not discharged, the processing proceeds to step S212, at which the above-described message is displayed, and the processing ends without image printing. On the other hand, if it is judged at step S211 that the cyan ink is discharged, i.e., all the color ink still remain, the processing proceeds to step S213, at which color image printing is executed. Thereafter, the processing ends.

Figure 8:
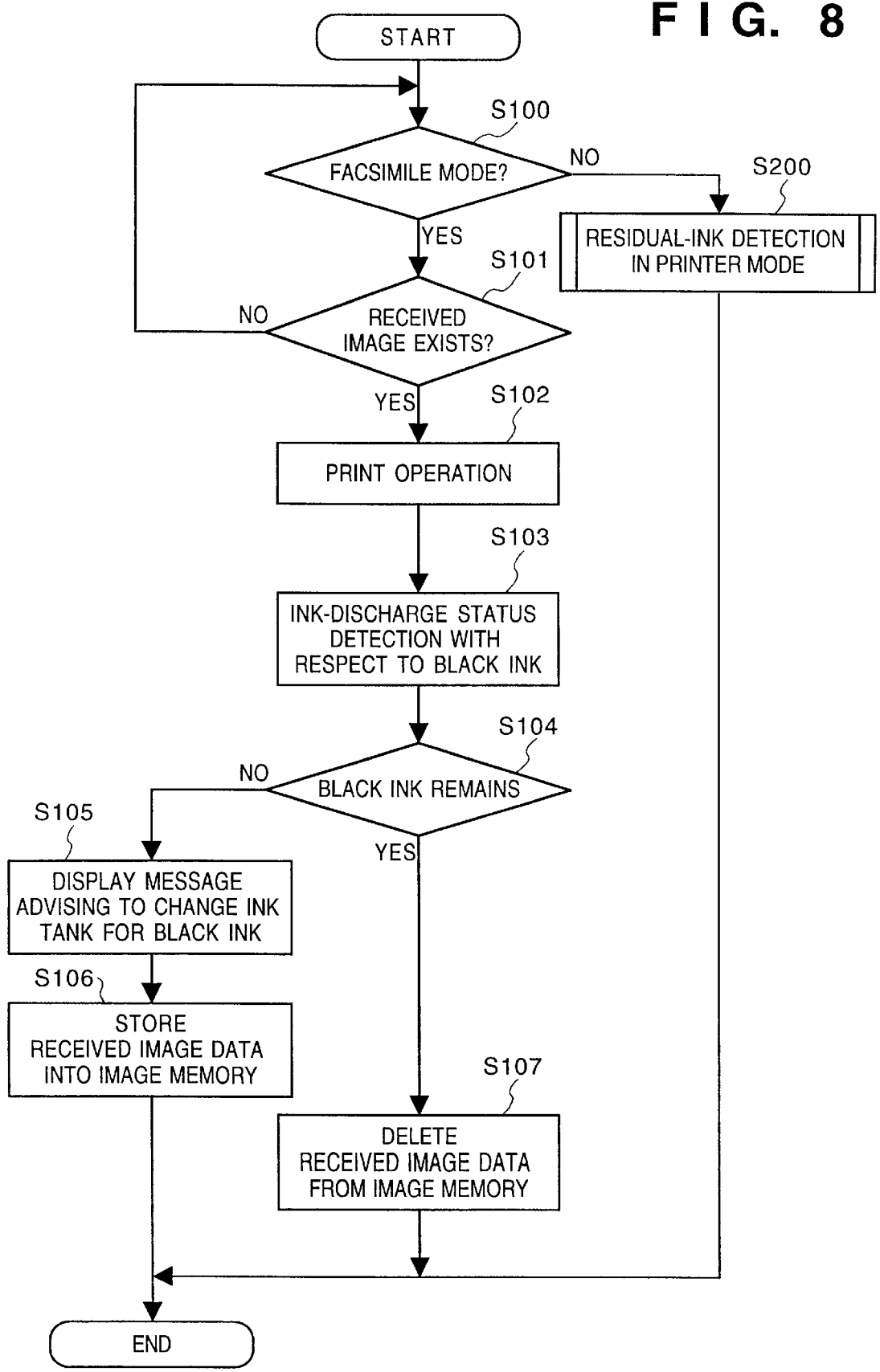
FIG. 8 is a flowchart showing ink-discharge status detection.
Figure 9:
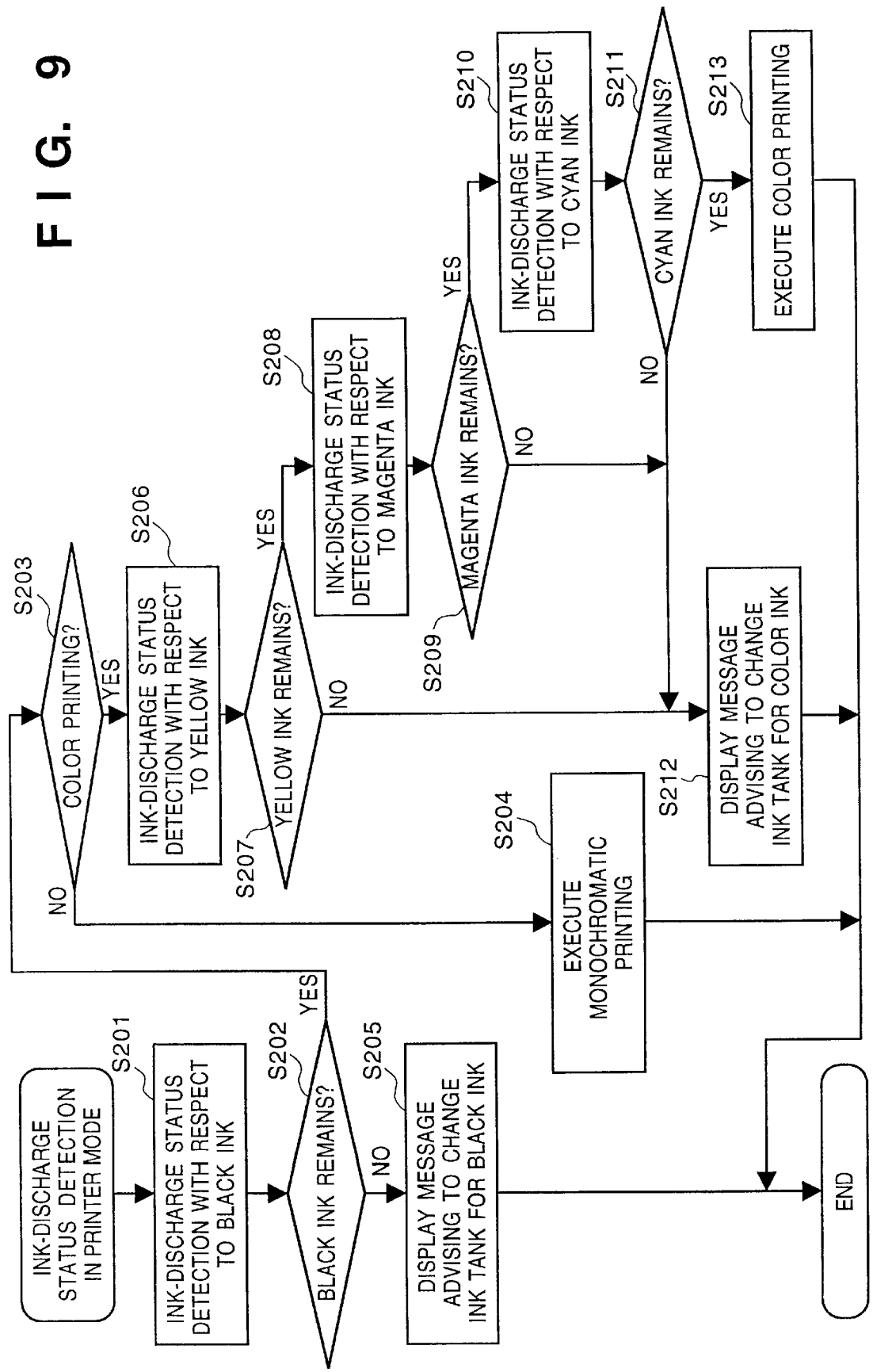
FIG. 9 is a flowchart showing ink-discharge status detection in a printer mode.

Note that in flowcharts of FIGS. 8 and 9, interval of ink-discharge status detection is not defined. However, especially in the facsimile mode, in consideration of: (1) once received image data is deleted from the image memory, re-printing is impossible unless the image data is re-transmitted from the transmitting side; (2) the capacity of the image memory is limited; and (3) the amount of received image data cannot be predicted, it is preferable to perform control such that ink-discharge status detection is made after the completion of print-output for one page, and based on the detection result, it is determined whether or not the received image data should be deleted from the image memory.

Similarly, in the printer mode, ink-discharge status detection can be made prior to print-output of each page.

Accordingly, in the present embodiment, when the apparatus operates in the facsimile mode, discharge status of ink is examined after printing based on received image data. A message advising to change an ink tank is displayed in accordance with the examination result, and received image data is stored. Thus the image data can be saved from being lost, and image printing based on the image data can be performed after the ink tank has been changed. When the apparatus operates in the printer mode, discharge status of ink is checked prior to print operation. If it is judged that necessary ink is not discharged, a message advising to change the ink tank is displayed, and image data received from the external computer 56 is stored into the image memory so that the data can be outputted after the ink tank has been changed. This prevents wasteful ink consumption.

Note that the present embodiment has been described as a facsimile apparatus, however, the present invention can be applied to a dedicated printer, which performs ink-discharge status detection as executed in the above printer mode.

In the facsimile apparatus of the present embodiment, ink-discharge status detection timing is changed depending upon whether the apparatus operates as a facsimile apparatus or as a printer connected to the external computer (host computer). That is, when the apparatus operates in the facsimile mode, ink-discharge status detection is performed after print operation, on the other hand, when the apparatus operates in the printer mode, ink-discharge status detection is performed print operation.

Next, the operation in the respective operation modes will be considered. When the apparatus operates in the facsimile mode, in most cases, a user is not around the apparatus since image output is performed based on automatically-received facsimile data and the user is not required to make any operation. Generally, in the facsimile mode, data transmitted via the telephone line from another device is stored into the image memory, and print output is performed when predetermined amount of data (e.g., for one page of print sheet) has been stored in the image memory, otherwise, all the transmitted data has been stored in the image memory. On the other hand, the capacity of the image memory is limited, therefore, after the completion of print output, the used image data is deleted from the image memory, for the next facsimile data reception. Accordingly, data once used in print operation does not remain in the apparatus. For this reason, the control to perform ink-discharge status detection and deletion of received image data based on the result of detection is particularly important.

On the other hand, when the apparatus operates in the printer mode, the user is usually around the apparatus for taking out printouts from the apparatus or for other purposes. Accordingly, when ink is exhausted and the printed result is in poor quality, otherwise, printing has not been made at all, due to ink-discharge failure or the like, the user can notice such trouble. Further, in the printer mode, since print data is transmitted from the host computer, the data usually remains in the host computer.

In consideration of the differences in operational environment as above, it is understood that in the facsimile mode, to perform re-printing using once-deleted data, the data must be re-transmitted from the transmitting side, while in the printer mode, re-printing can be easily performed by re-transferring the data from the host computer. In the printer mode, even if ink is exhausted then printing cannot be normally performed and re-printing must be performed, the print data can be easily re-transferred from the host computer. Therefore, in the printer mode, it can be arranged such that ink-discharge status detection is omitted, instead, the user judges whether ink remains or not by visual confirmation.

Further, the printhead used in the above embodiment includes an exchangeable ink tank, especially, the printhead for color printing has a black ink tank and a color ink tank. However, the present invention is not limited to this printhead. In case of monochrome printhead, for example, a cartridge type printhead in which an ink tank and a printhead are integrated can be used so that when ink is exhausted, the cartridge can be changed. Further, in case of color printhead, a printhead including independent magenta, cyan and yellow ink tanks can be used.

The embodiment described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of the so-called on-demand type or a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, an exchangeable chip type printhead which can be electrically connected to the apparatus main unit and can receive an ink from the apparatus main unit upon being mounted on the apparatus main unit or a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices or to an apparatus comprising a single device.

Furthermore, the invention is also applicable to a case where the invention is embodied by supplying a program to a system or apparatus. In this case, a storage medium, storing a program according to the invention, constitutes the invention. The system or apparatus installed with the program read from the medium realizes the functions according to the invention.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus which uses an inkjet printhead, the inkjet printhead having an exchangeable ink tank containing a plurality of colored inks including black ink and being capable of color printing, the inkjet printhead further having plural nozzles corresponding to the plurality of colored inks, wherein said printing apparatus performs printing by discharging ink from the plural nozzles of the inkjet printhead onto a print medium, said printing apparatus comprising:

input means for inputting print data from an external device;

a detection device to detect whether or not ink is normally discharged from said inkjet printhead;

test discharge means for discharging a text discharge of ink from said inkjet printhead toward said detection device;

test-discharge control means for controlling said test discharge means to perform the test discharge; and print control means for selecting a mode from among plural modes including at least a first printing mode and a second printing mode, the first printing mode for printing by using at least one of the plurality of colored inks, and the second printing mode for printing by using only the black ink, said print control means for performing a printing operation on the first mode in a case where the first printing mode is selected and when it is confirmed in accordance with a detection result by said detection device that all the plurality of colored inks are discharged, and for performing a printing operation in the second printing mode in case where the second printing mode is selected and when it is confirmed in accordance with the detection result that at least the black ink is discharged.

2. The apparatus according to claim 1, wherein the plurality of colored inks include magenta ink, cyan ink, yellow ink and black ink, and wherein said test-discharge control means uses said test discharge means to test-discharge all the magenta ink, the cyan ink, the yellow ink and the black ink in the first printing mode.

3. The apparatus according to claim 2, further comprising print-operation judgment means for judging whether print operation to be executed is monochrome printing using only the black ink or color printing using the magenta ink, the cyan ink, the yellow ink and the black ink, based on the print data inputted by said input means, and wherein the first printing mode is for color printing, while the second printing mode is for monochrome printing.

4. The apparatus according to claim 3, wherein if said print-operation judgment means judges that the print operation to be executed is the monochrome printing, said print control means executes the monochrome printing when it is confirmed that the black ink remains.

5. The apparatus according to claim 2, wherein said printhead capable of color printing comprises four exchangeable ink tanks respectively for containing the magenta ink, the cyan ink, the yellow ink and the black ink.

6. The apparatus according to claim 2, wherein said printhead capable of color printing comprises an exchangeable first ink tank for containing the magenta ink, the cyan ink and the yellow ink, and an exchangeable second ink tank for containing the black ink.

7. The apparatus according to claim 1, wherein said detection device includes:

light-emission means for emitting light to a position where ink discharged from ink-discharge orifices passes;

photoreception means for receiving the light emitted by said light-emission means; and measurement means for measuring a time period during which the light is interrupted by the ink between said light-emission means and said photoreception means.

8. The apparatus according to claim 7, wherein said light-emission means includes an infrared LED.

9. The apparatus according to claim 7, wherein said photoreception means includes a photo-transistor which generates an electric signal based on the light received by said photoreception means.

10. The apparatus according to claim 7, wherein said light-emission means and said photoreception means are situated such that an optical axis of the light emitted by said light-emission means to said photoreception means is parallel to an ink-discharge nozzle array of said printhead.

11. The apparatus according to claim 10, wherein a distance between said light-emission means and said photoreception means is longer than a length of the ink-discharge nozzle array.

12. The apparatus according to claim 1, wherein said inkjet printhead discharges ink by utilizing thermal energy, and comprises electrothermal transducers for generating thermal energy to be supplied to ink.

13. The apparatus according to claim 1, further comprising:

an interface unit connecting with a host, and receiving image information transmitted from the host;

a receiving unit receiving image information transmitted via a communication line; and a memory storing the image information received by said interface and receiving units, wherein the first printing mode is a printer mode for performing an image formation based on the image information received by said interface unit, while the second printing mode is a facsimile mode for performing an image formation based on the image information received by said receiving unit.

14. An image forming apparatus which uses an inkjet printhead which discharges ink and which forms an image on a printing medium by said inkjet printhead, based on image information, comprising:

an interface unit connecting with a host, and receiving image information transmitted from the host;

a receiving unit receiving image information transmitted via a communication line;

a memory storing the image information received by said interface and receiving units;

a detection device which detects whether or not ink is normally discharged from said inkjet printhead; and control means for selecting a mode from among plural modes including at least a printer mode and a facsimile mode, the printer mode for performing an image formation based on the image information transmitted from the host, and the facsimile mode for performing an image formation based on the image information transmitted via the communication line, said control means further for, when the printer mode is selected, performing a detection operation by said detection device prior to image formation, and for, when the facsimile mode is selected, storing the image information transmitted via the communication line into the memory and performing a detection operation by said detection device after performing image formation on a predetermined amount of the image information in accordance with the stored image information.

15. The apparatus according to claim 14, wherein, if it is detected by said detection device in the facsimile mode that ink is discharged by said inkjet printhead after the image formation corresponding to the predetermined amount of image information is performed, said control means deletes the predetermined amount of image information from said memory.

16. The apparatus according to claim 15, wherein if it is detected by said detection device in the facsimile mode that ink is not discharged by said inkjet printhead after the image formation corresponding to the predetermined amount of image information is performed, said control means holds the predetermined amount of image information in said memory and halts subsequent printing operations.

17. The apparatus according to claim 15, further comprising notifying means for notifying a user of a notice in accordance with a detection result by said detection device, and wherein, if it is detected by said detection device in the facsimile mode that ink is not discharged by said inkjet printhead after the image formation corresponding to the predetermined amount of image information is performed, said control means control said notifying means so as to perform the notice without deleting the predetermined amount of image information from said memory.

18. The apparatus according to claim 14, wherein said detection device includes:

a light-emission device emitting light; and a photoreception device receiving the light emitted by said light-emission device.

19. The apparatus according to claim 18, wherein said light-emission device is an infrared LED.

20. The apparatus according to claim 18, wherein said photoreception device is a photo-transistor which generates an electric signal based on the received light.

21. The apparatus according to claim 18, wherein said inkjet printhead includes a plurality of ink-discharge nozzles arrayed in a predetermined direction, and said light-emission device and said photoreception device are situated such that an optical axis of the light emitted by said light-emission device to said photoreception device is approximately parallel to an arrayed direction of the plurality of ink-discharge nozzles.

22. The apparatus according to claim 21, further comprising scanning means for scanning said inkjet printhead, wherein said control means performs control such that said scanning means scans said inkjet printhead in relation to a position of the detection device, and further performs the detection operation by said detection device by discharging ink from said inkjet printhead during the scanning operation by said scanning means.

23. The apparatus according to claim 21, wherein said light-emission device and said photoreception device are situated such that a length between said light-emission device and said photoreception device is longer than an arrayed length of the plurality of ink-discharge nozzles.

24. The apparatus according to claim 14, wherein said inkjet printhead is a color printing printhead discharging a plurality of colored inks including black ink, and said control means performs the detection operation in the printer mode by detecting whether or not the plurality of colored inks are discharged, and performs the detection operation in the facsimile mode by detecting whether or not only the black ink is discharged.

25. The apparatus according to claim 14, wherein said inkjet printhead is exchangeable between a first printhead discharging only black ink and a second printhead discharging a plurality of colored inks including black ink, and if the second printhead is used, said control means performs the detection operation in the printer mode by detecting whether or not the plurality of colored inks are discharged, and performs the detection operation in the facsimile mode by detecting whether or not only the black ink is discharged.

26. The apparatus according to claim 14, further comprising scanning means for scanning said inkjet printhead, wherein said control means performs control such that said scanning means scans said inkjet printhead in relation to a position of the detection device, in a case where the detection operation by said detection device is performed.

27. The apparatus according to claim 14, wherein said inkjet printhead comprises electrothermal transducers for generating thermal energy to be supplied to ink, and discharges ink by utilizing the thermal energy.

28. A printing control method adapted to a printing apparatus which uses an ink tank containing a plurality of colored inks including black ink and an inkjet printhead having plural nozzles corresponding to the plurality of colored inks, and which performs printing by discharging ink from the plural nozzles of the inkjet printhead on a print medium, comprising the steps of:

inputting print data from an external device;

discriminating, based on the inputted print data, whether a monochrome printing using only the black ink is to be performed or a color printing using the plurality of colored inks is to be performed;

test-discharging ink from said inkjet printhead toward a detection device so as to detect whether or not ink is normally discharged from said inkjet printhead;

performing a printing operation, in a case where a first printing mode for printing by using at least one of the plurality of colored inks is selected, when it is detected in accordance with the detection result that all the plurality of colored inks are discharged; and performing a printing operation, in a case where a second printing mode for printing by using only the black ink is selected, when it is detected in accordance with the detection result that at least the black ink is discharged.

29. The method according to claim 28, wherein the plurality of colored inks include magenta ink, cyan ink, yellow ink and black ink, and wherein, at said test-discharging step, all the magenta ink, the cyan ink, the yellow ink and the black ink are test-discharged in the first printing mode.

30. The method according to claim 28, wherein said inkjet printhead comprises electrothermal transducers for generating thermal energy to be supplied to ink, and discharges ink by utilizing the thermal energy.

31. A method of detecting an ink-discharge status in an apparatus which uses an inkjet printhead to discharge ink, which forms an image on a printing medium by said inkjet printhead based on image information, and which comprises: an interface unit connecting with a host and receiving image information transmitted from the host; a receiving unit receiving image information transmitted via a communication line; a memory storing the image information received by said interface and receiving units; and a detection device detecting whether or not ink is normally discharged from said inkjet printhead, said method comprising the steps of:

selecting from among plural modes including at least a printer mode for performing an image formation based on the image information transmitted from the host, and a facsimile mode for performing an image formation based on the image information transmitted via the communication line;

when the printer mode is selected, performing a detection operation by said detection device prior to image formation, and further performing image formation when it is detected that ink is discharged from said inkjet printhead; and when the facsimile mode is selected, performing a detection operation by said detecting device after storing the image information transmitted via the communication line into the memory and performing image formation on a predetermined amount of image information in accordance with the stored image information.

32. The method according to claim 31, further comprising the step of deleting the predetermined amount of image information from the memory if it is detected by said detection device in the facsimile mode that ink is discharged by said inkjet printhead after the image formation corresponding to the predetermined amount of image information.

33. The method according to claim 32, further comprising the step of halting subsequent printing operation without deleting the image information stored in the memory if it is detected by said detection device in the facsimile mode that ink is not discharged by said inkjet printhead after the image formation corresponding to the predetermined amount of image information.

34. The method according to claim 32, further comprising informing a user of a notice, without deleting the predetermined amount of image information from the memory, when it is detected by the detection device in the facsimile mode that ink is not discharged by said inkjet printhead after the image formation corresponding to the predetermined amount of image information.

35. The method according to claim 31, wherein said inkjet printhead comprises electrothermal transducers for generating thermal energy to be supplied to ink, and discharges ink by utilizing the thermal energy.

36. The apparatus according to claim 1, wherein, in the second printing mode, said print control means controls whether or not to perform the printing operation based on the detection result of only the black ink.

37. The method according to claim 28, wherein, in the second printing mode, a control of whether or not to perform the printing operation based on the detection result of only the black ink is performed.

* * * * *